United States Patent
Janapaty et al.

(10) Patent No.: US 7,260,164 B2
(45) Date of Patent: Aug. 21, 2007

(54) EFFICIENT FILTERING OF RXLOS SIGNAL IN SERDES APPLICATIONS

(75) Inventors: Vijay Janapaty, Santa Clara, CA (US); Rishi Chugh, San Jose, CA (US); Rajinder Cheema, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 852 days.

(21) Appl. No.: 10/444,697

(22) Filed: May 23, 2003

(65) Prior Publication Data

US 2004/0234015 A1   Nov. 25, 2004

(51) Int. Cl.
*H04B 1/10* (2006.01)
(52) U.S. Cl. ............... 375/350; 375/376; 375/359; 375/361; 327/34; 327/552; 235/440; 377/111
(58) Field of Classification Search ................. 375/350, 375/376, 359–361; 327/34, 552; 235/440; 377/111
See application file for complete search history.

(56) References Cited

U.S. PATENT DOCUMENTS

| 4,775,840 | A | * | 10/1988 | Ohmori et al. | ............... 327/34 |
| 5,001,374 | A | * | 3/1991 | Chang | ......................... 327/552 |
| 5,770,846 | A | * | 6/1998 | Mos et al. | ................... 235/440 |
| 6,026,141 | A | * | 2/2000 | Lo | .............................. 377/111 |
| 6,914,951 | B2 | * | 7/2005 | Erickson et al. | ............. 375/350 |
| 7,003,066 | B1 | * | 2/2006 | Davies et al. | ............... 375/376 |

\* cited by examiner

*Primary Examiner*—Chieh M. Fan
*Assistant Examiner*—Sudhanshu C. Pathak
(74) *Attorney, Agent, or Firm*—Suiter West PC LLO

(57) ABSTRACT

An efficient filter circuit and method for filtering a loss of receiver signal prevents false signals caused by glitches. The short glitches that happen at the positive edge of the clock signal may be prevented from affecting the whole clock cycle. The false signal removal circuitry is effective against both false active high and false active low signals. A selectable majority determination block also measures the number of glitches or average signal strength to determine that a valid signal is present. A mininum pulse width of a glitch is settable.

16 Claims, 6 Drawing Sheets

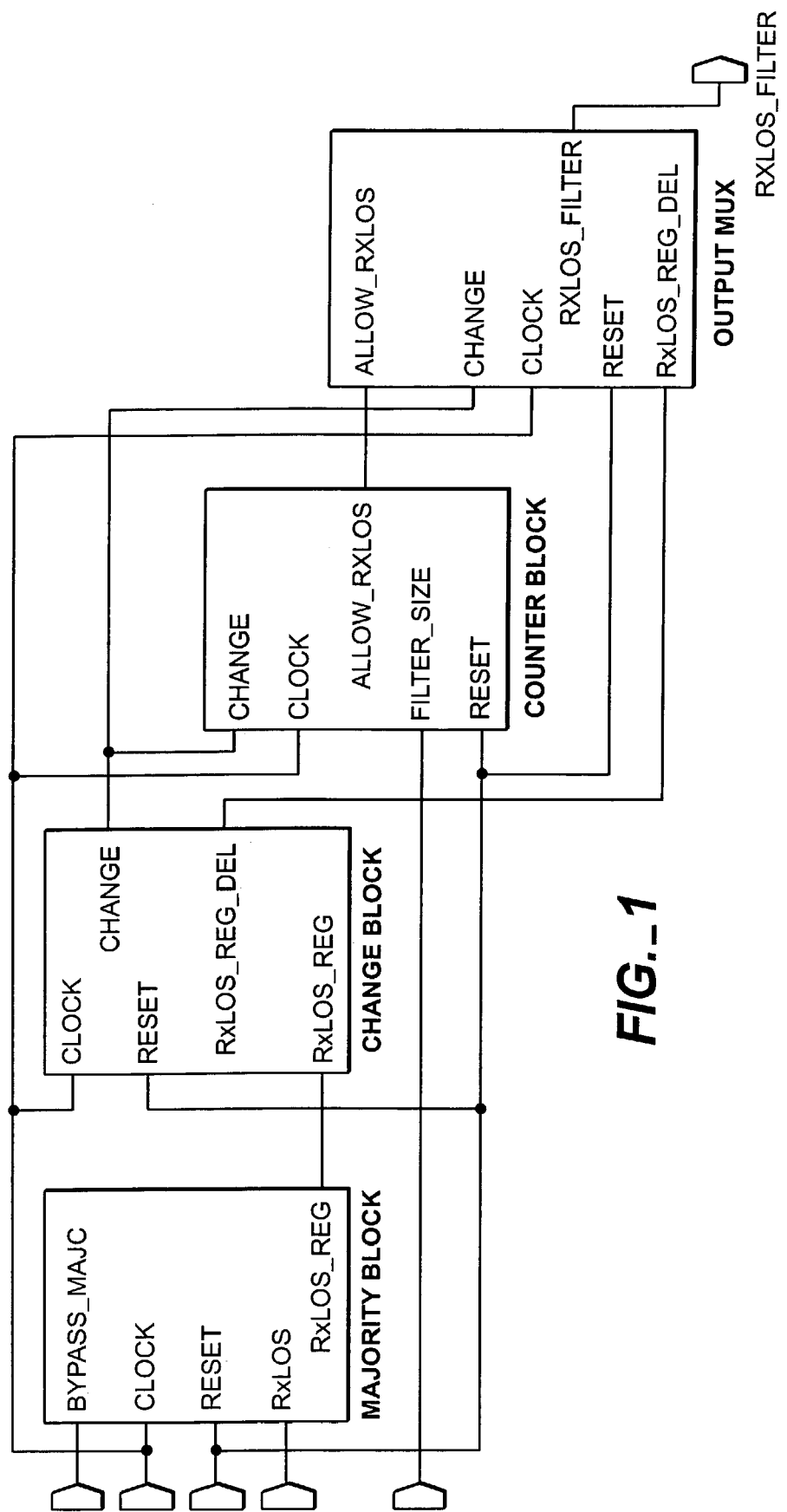
FIG._1

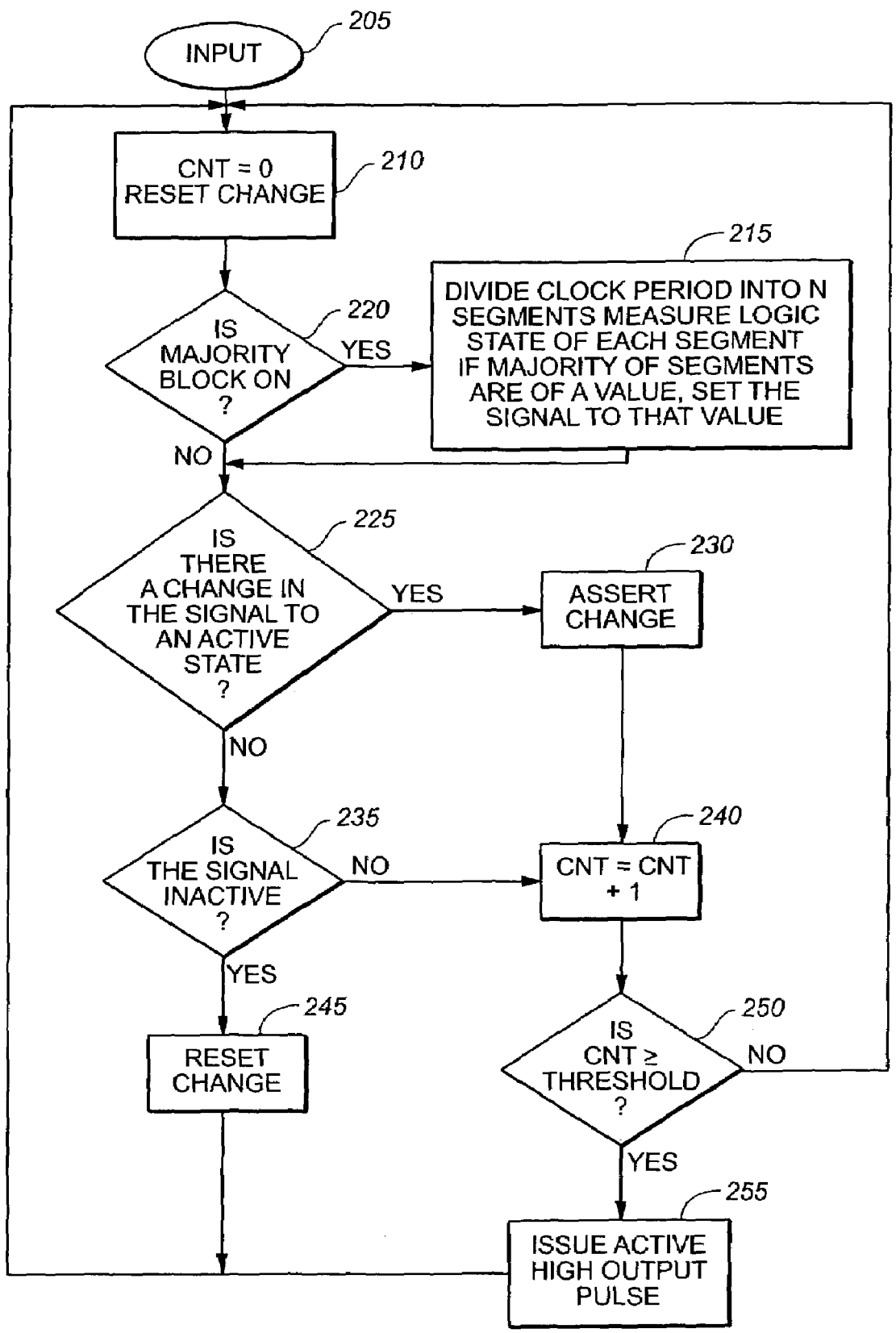
FIG._2

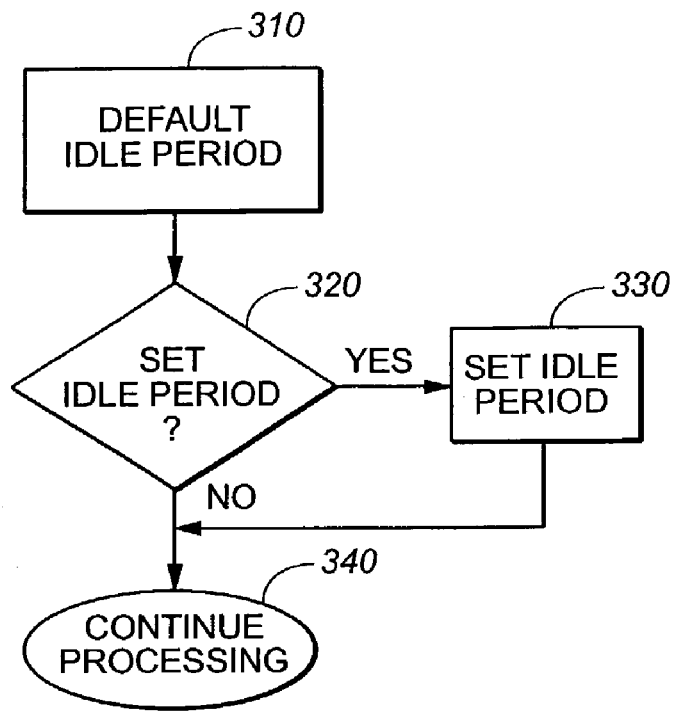
FIG._3
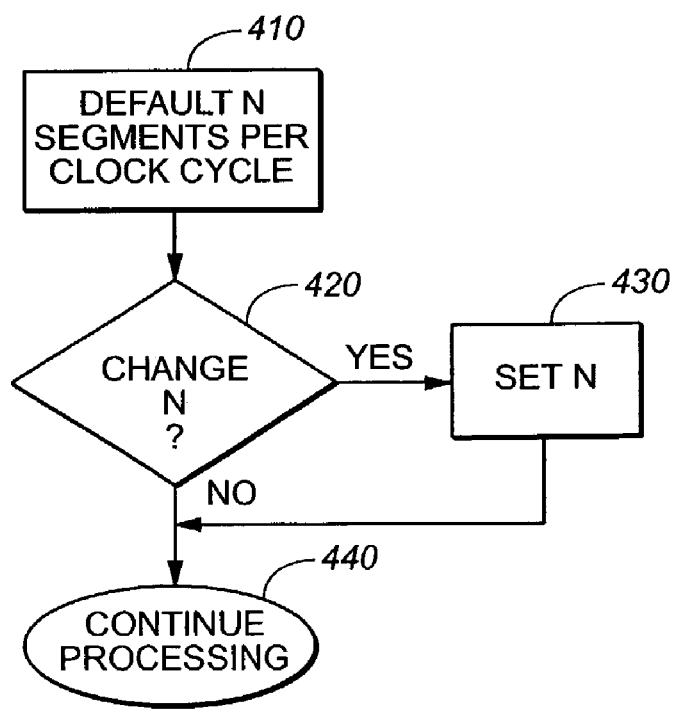
FIG._4

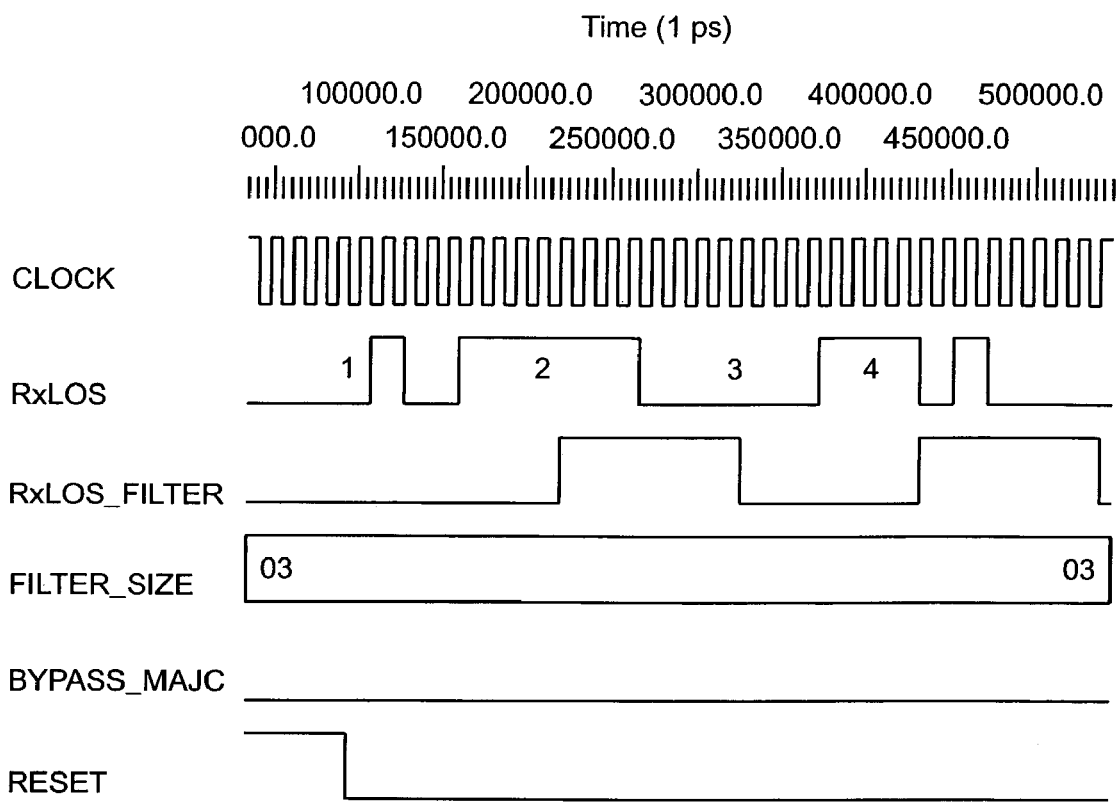
COMWAKE Example
1. 20ns Noise
2. 106.7ns signal
3. 106.7ns idle
4. 106.7ns signal with a 20ns noise
*FIG._5*

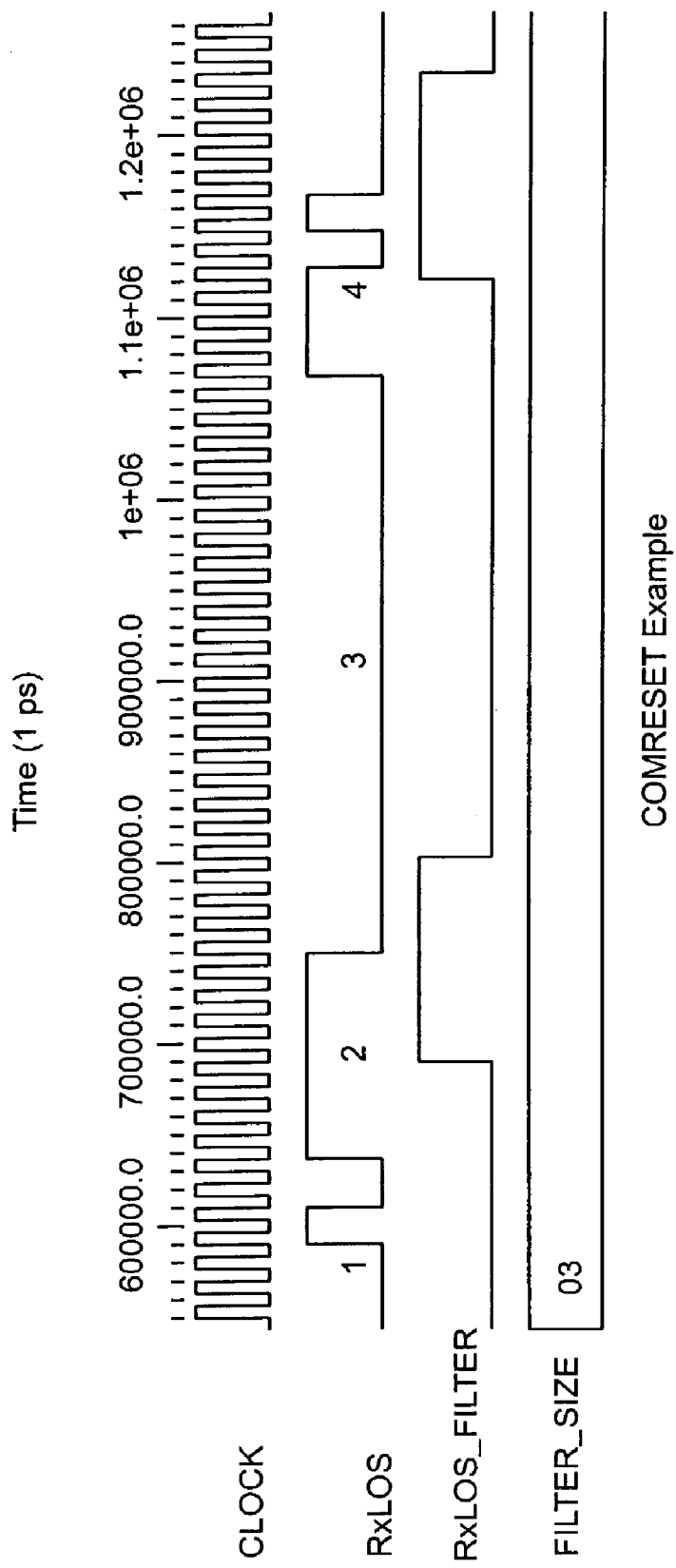
FIG._6

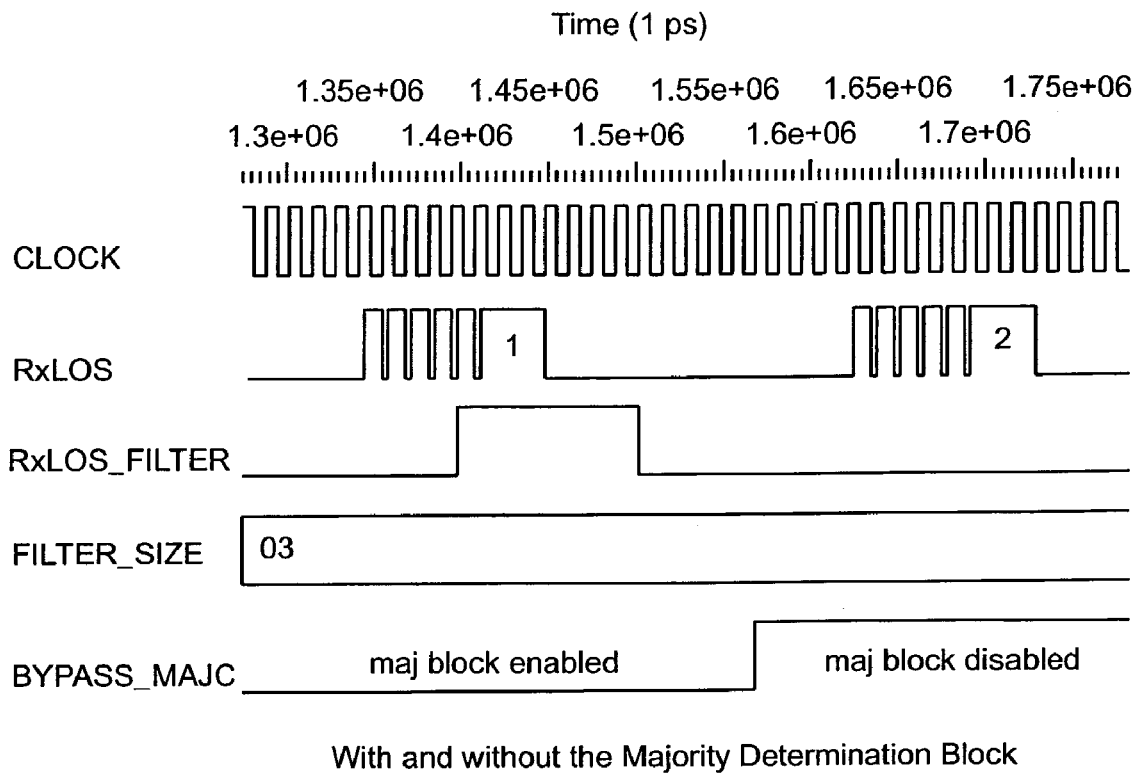
FIG._7

EFFICIENT FILTERING OF RXLOS SIGNAL IN SERDES APPLICATIONS

FIELD OF THE INVENTION

The present invention generally relates to the field of high speed serial communications, and particularly to signal filtering for a receiver loss of signal from a serializer/deserializer.

BACKGROUND OF THE INVENTION

The RxLOS signal is an output of the analog signal detection circuit of a typical SerDes (serializer/deserializer) core and indicates a loss of signal at the receiver of SerDes. The RxLOS signal can switch between logic 0 and logic 1 in a short period of time and may experience active high or active low glitches for a short period of time. These RxLOS signal glitches can erroneously trigger a set of events in the logic that the SerDes interfaces with. An active high glitch may erroneously indicate a loss of signal at the receiver and may cause the synchronization state machines in the interface logic to be reset. Similarly, an active low glitch may erroneously indicate a recovery of the lost signal at the receiver and may cause the synchronization of the state machines to go out of the reset state.

Glitches must be filtered before the RxLOS signal is used in the logic interfacing of the SerDes core. The size of the glitches that need to be filtered varies with the specific application of the SerDes core and with the protocol. Protocols that implement Out of Band (OOB) signaling like Serial-ATA (SATA) and Serial Attached SCSI (SAS) require that the glitches less than 106 ns wide be filtered while in protocols like FC (Fibre Channel) and Ethernet, glitches larger than 106 ns may need to be filtered.

Although some current circuits filter active high glitches and some current circuits allow the size of the glitches to be a variable, the capabilities of these circuits are limited. There is a need for circuits to filter both active high and active low glitches; especially, to handle the short glitches that may occur at the positive edge of the clock. There is also a need for a circuit that reduces the amount of on-chip real estate by minimizing the number of gates and/or switches.

Therefore, it would be desirable to provide a method of signal filtering and a filter circuit that efficiently and reliably removes both active high and active low glitches and allows adjustability of the idle period.

SUMMARY OF THE INVENTION

Accordingly, the present invention is directed to a circuit and method that efficiently filters glitches for an RxLOS signal in which the user determines the detectable glitch size.

In a first aspect of the present invention, a circuit for filtering a digital signal (i.e., RxLOS) includes change determination circuitry that issues a first signal if the digital signal changes from a first value to a second value and issues a second signal, counter circuitry that is initialized when the first signal is issued, and output mux circuitry that outputs one of either a third signal or a fourth signal as the output signal. Optionally, the circuit may include majority determination circuitry.

In a second aspect of the present invention, a method for filtering a digital signal comprises the steps of determining if a change occurred in the digital signal to an active state, setting a change flag if the change is to an active state of the signal, determining if the active state has lasted for a given duration, and if the active state has lasted for a given duration, transmitting an active state level for an output signal.

In a third aspect of the present invention, a circuit for filtering a signal input to a receiver includes means for determining a change in the logic level of an input signal, means for initializing a count when the change occurs; and means for outputting one of multiple signals that represent a filtered version of the input signal. Optionally, the circuit may include means for making a majority determination of glitches during a clock cycle.

The present invention offers several advantages. The circuit may be used in applications where noise in a signal (bound by the size of the glitch) needs to be filtered. The use of a single circuit to filter both active high and active low glitches provides the benefit of a reduced gate count for the required implementation. The size of the glitch to be filtered is user defined so the single circuit may be used in various applications (i.e., Serial protocols) by choosing the glitch size.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 shows a functional block diagram of an exemplary embodiment of a circuit of the present invention;

FIG. 2 illustrates a flow chart for an embodiment of the method of the present invention;

FIG. 3 illustrates a flow chart for setting an idle period in an embodiment of the method of the present invention;

FIG. 4 illustrates a flow chart for setting the number of segments per clock cycle in an embodiment of the present invention;

FIG. 5 shows an example of filtering for a COMWAKE signal;

FIG. 6 shows an example of filtering a COMRESET signal;

FIG. 7 shows an example of filtering using a majority determination block.

DETAILED DESCRIPTION OF THE INVENTION

Reference will now be made in detail to the presently preferred embodiments of the invention, examples of which are illustrated in the accompanying drawings.

The present invention provides a circuit and method for filtering out unwanted glitches for a signal; especially, an RxLOS signal. The circuit and method may operate in a mode that completely ignores glitches or pulses of less than a minimum width. Alternatively, the circuit and method may incorporate an added functionality in which the glitches or pulses are weighted or summed during a clock cycle so that if the weight or sum exceeds a threshold, the signal is treated as having a logic state corresponding to the logic state above the threshold.

A block diagram of an exemplary embodiment of the present invention is shown in FIG. 1. The circuit provides the filtered RxLOS (RXLOS_FILTER) and takes the following inputs: 1) Clock from the interface logic (CLOCK); 2) Reset (RESET); 3) a 4-bit FILTER_SIZE (FILTER_SIZE * Period of CLOCK determines the size of the glitch that is being filtered); 4) RxLOS signal from the analog detection circuit; and 5) BYPASS_MAJC which when asserted allows the user to bypass the majority determination block. The circuit has the following blocks: a. majority determination block, b. change determination block, c. counter block, and d. output mux block.

Majority determination block. The purpose of this block is to determine the logic level of the RxLOS signal, which is an output of the analog detection circuit, and to screen extremely small glitches that happen at the positive edge of CLOCK, which would otherwise be elongated to a CLOCK period by the digital logic. A portion of the clock period is divided into five or another odd number of parts. The logic level of the RxLOS signal is determined in these five segments, using clocks delayed from CLOCK. The majority value of the levels in these five segments is determined and provided as the output. The user can choose the five segments by choosing delay cells from the CLOCK. Alternatively, a delay line or a series of inverters may be used. The majority determination function may be accomplished by various techniques. For example, the segments may be counted by a counter or weighted by logic gates. As another example, the average value of the signal during the clock cycle may be compared against a threshold. Also, the user has the ability to bypass the majority determination block by asserting BYPASS_MAJC in which the output of the block is the registered value of RxLOS (CLOCK domain). Optionally, a faster but synchronous clock (to the CLOCK domain) may be employed to improve resolution in this block.

Change determination block. This block receives the output of the majority determination circuit and determines if there is a change in two consecutive cycles. If it detects a change, then it asserts the output, CHANGE. The change determination block also provides another output, RXLOS_REG_DEL, which is a delayed version of the output of the majority determination circuit.

Counter block. The counter block contains a 4-bit counter that is initialized if CHANGE is asserted. It counts up to FILTER_SIZE and freezes. If the count reaches FILTER_SIZE, then its output, ALLOW_RXLOS, is asserted. The count of the counter block may use fewer bits than four, such as two or three, or may use a greater number of bits, such as five, according to the needs of the application. The counter may count down instead of count up. Other variations are within the spirit and scope of the present invention.

Output mux block. If ALLOW_RXLOS is asserted this block sets the output, RXLOS_FILTER, to be RXLOS_REG_DEL. Otherwise, the output mux block recirculates RXLOS_FILTER. The output mux block may be implemented with the minimal number of switches and/or logic gates to reduce the overall propagation delay of the filtering circuit.

FIGS. 2-4 illustrate a flow chart for an embodiment of the method of the present invention. A digitized analog input is received 210 as by an analog-to-digital converter. The counter is initialized to zero. The CHANGE flag is cleared. If the majority block is turned on 220, the clock period is divided into N segments, the logic state of each segment is determined, and the value of the input signal for the entire clock cycle is set to the value of the majority of segments 215. Processing proceeds to step 225 where a determination is made as to whether the input signal has changed to an active state during the present clock cycle 225. If the signal has become active, the CHANGE flag is set 230 and the counter increments 240. If the input signal has not become active during the present clock cycle 235, a determination is made whether the signal is inactive 235. If not, the counter increments 240. After the counter increments, a determination is made as to whether the count of the counter equals or exceeds a threshold 250. If it does not, processing proceeds to step 210 where another sample is taken. Otherwise, an active high pulse is generated 255. If in step 235, the signal is inactive, the CHANGE flag is reset 245 and the input signal is sampled 210. It will be appreciated that variations of the present method may be implemented within the spirit and scope of the invention.

FIGS. 3 and 4 illustrate exemplary methods for setting the idle period and the number of segments per clock cycle, respectively. In FIG. 3, a default idle period is set 310. If the user or a software process is found to request setting the idle period 320, the idle period is set 330 and processing proceeds. In FIG. 4, a default number N of segments per clock cycle is set 410. If the user or software process indicates that the number N of segments is to be changed 420, the number N is changed 430 and processing proceeds 440. The adjustment methods of FIGS. 3 and 4 may be implemented as part of the general method of FIG. 2.

Serial Advanced Technology Attachment (Serial ATA) is a full duplex protocol. Out of band signals are used in Serial ATA to initialize the communication links between a transmitter and a receiver. Serial ATA uses three OOB signals to establish communications between the transmitter and the receiver. An exemplary handshaking scenario between the transmitter and the receiver follows. On power up, the transmitter sends COMRESET to the receiver. The receiver responds by sending COMINIT to the transmitter. The transmitter releases COMRESET. The transmitter then calibrates. The receiver releases COMINIT. The transmitter then sends COMWAKE. The receiver calibrates. The receiver sends COMWAKE.

FIG. 5 shows the simulation of the COMWAKE scenario. In this example, in the time period marked by 1, an active high glitch of 20 ns is shown. This is followed by a signal for about 106.7 ns (corresponding to COMWAKE or COMRESET active pulse widths) (shown by time period marked by 2). An idle period of 106.7 ns is shown in time period 3. In time period 4, 106.7 ns signal is shown, a part of which is eclipsed by 20 ns of active low glitch. The circuit has efficiently filtered all the glitches when the FILTER_SIZE was set to '3'.

Keeping the same settings as in the above example, a COMRESET scenario is shown in FIG. 6. In this simulation, the time period 3 was elongated to 320 ns. The circuit again filters all the glitches.

In FIG. 7, the utility of majority determination block is demonstrated. In time period 1, this block is enabled while it is disabled in time period 2. In both these periods, an RxLOS signal interspersed with active low glitches, primarily located at the positive edge of CLOCK, is fed into the circuit. The results clearly demonstrate that the majority determination block, when enabled, allows for efficient filtering.

The circuit described above efficiently filters both active high and active low signals. It also allows the user to choose the size of the glitch to be filtered by choosing the 4-bit input FILTER_SIZE. Moreover, it has the ability to screen extremely small glitches at the positive edge of the CLOCK, using the majority determination block, which would otherwise be elongated to the CLOCK period by the digital logic.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form hereinbefore described being merely an explanatory embodiment thereof. It is the intention of the following claims to encompass and include such changes.

What is claimed is:

1. A circuit for filtering a digital signal, comprising:
   a majority determination circuitry that keeps track of glitches, in the digital signal, the majority determination circuitry divides a period of a clock into n segments and determines a logic level of each of the n segments, wherein if a majority of the n segments is of a first value, a value of the output signal is equal to the first value;
   a change determination circuitry that issues a first signal if an output of the majority determination circuitry changes from the first value to a second value and issues a second signal if the output of the majority determination circuitry does not change from the first value to the second value;
   a counter circuitry that is initialized when the first signal is issued; and
   an output mux circuitry that outputs one of either a third signal or a fourth signal as a output signal based upon a counter circuitry output signal.

2. The circuit of claim 1, wherein the third signal is the same as the second signal.

3. The circuit of claim 1, wherein the fourth signal does not change if the counter circuitry output signal is not received.

4. The circuit of claim 1, wherein n is an odd number.

5. The circuit of claim 4, wherein n is equal to five.

6. The circuit of claim 1, wherein the output signal is a filtered RxLOS signal.

7. The circuit of claim 1, wherein the circuit processes signals according to the Serial Advanced Technology Attachment protocol.

8. The circuit of claim 7, wherein the digital signal is COMWAKE.

9. The circuit of claim 7, wherein the digital signal is COMRESET.

10. A method for filtering a digital signal, comprising the steps of:
    determining if a change occurred in the digital signal;
    setting a change flag if the change is to an active state of the digital signal;
    determining if the active state has lasted for a given duration;
    if the active state has lasted for a given duration, transmitting an active state level for an output signal,
    dividing a clock cycle into an odd number of segments, the odd number being greater than one, the step of dividing the digital signal into an odd number of segments occurring before the step of determining if a change occurred in the digital signal, and
    determining the state of the digital signal during the majority of the segments of the clock cycle and using that state as the state of the digital signal.

11. The method of claim 10, wherein the digital signal is a receiver loss of signal.

12. The method of claim 10, wherein the digital signal conforms to a serial advanced technology attachment protocol.

13. The method of claim 10, further comprising the step of adjusting an idle period of the output signal.

14. The method of claim 10, wherein the number of segments is adjustable.

15. The method of claim 10, wherein the active state level of the output signal is a pulse of limited duration.

16. The method of claim 15, wherein the pulse of limited duration is between 50 nanoseconds and 250 nanoseconds in length.

* * * * *